(12) United States Patent
Yilmaz et al.

(10) Patent No.: US 10,677,932 B2
(45) Date of Patent: *Jun. 9, 2020

(54) SYSTEMS, METHODS, AND DEVICES FOR GEO-LOCALIZATION

(71) Applicant: Ohio State Innovation Foundation, Columbus, OH (US)

(72) Inventors: Alper Yilmaz, Lewis Center, OH (US); Ashish Gupta, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,015

(22) Filed: Sep. 25, 2018

(65) Prior Publication Data

US 2019/0025439 A1    Jan. 24, 2019

Related U.S. Application Data

(63) Continuation of application No. 15/048,285, filed on Feb. 19, 2016, now Pat. No. 10,101,466.

(51) Int. Cl.
*G01S 19/51* (2010.01)
*G01C 21/20* (2006.01)
(Continued)

(52) U.S. Cl.
CPC ............ *G01S 19/51* (2013.01); *G01C 21/206* (2013.01); *G01C 21/30* (2013.01); *G01S 5/16* (2013.01);
(Continued)

(58) Field of Classification Search
CPC ............ G01S 19/45; G01S 19/26; G01S 19/51
See application file for complete search history.

(56) References Cited

U.S. PATENT DOCUMENTS 9,372,088 B2   6/2016  Lacaze et al.
9,377,310 B2   6/2016  Stipes et al.
(Continued)

OTHER PUBLICATIONS

G. Schindler, M. Brown and R. Szeliski., "City-Scale Location Recognition," in International Conference on Computer Vision and Pattern Recognition (CVPR2007). Minneapolis, Jun. 2007.
(Continued)

*Primary Examiner* — Thomas G Black
*Assistant Examiner* — Ana D Thomas
(74) *Attorney, Agent, or Firm* — Benesch, Friedlander, Coplan & Aronoff LLP

(57) ABSTRACT

According to the embodiments provided herein, a trajectory determination device for geo-localization can include one or more relative position sensors, one or more processors, and memory. The one or more processors can execute machine readable instructions to receive the relative position signals from the one or more relative position sensors. The relative position signals can be transformed into a sequence of relative trajectories. Each of the relative trajectories can include a distance and directional information indicative of a change in orientation of the trajectory determination device. A progressive topology can be created based upon the sequence of relative trajectories; this progressive topology can be compared to map data. A geolocation of the trajectory determination device can be determined.

28 Claims, 10 Drawing Sheets

(51) Int. Cl.
  *G01C 21/30* (2006.01)
  *G01S 19/26* (2010.01)
  *G01S 19/45* (2010.01)
  *G01S 19/39* (2010.01)
  *G01S 5/16* (2006.01)

(52) U.S. Cl.
  CPC .............. *G01S 19/26* (2013.01); *G01S 19/39* (2013.01); *G01S 19/45* (2013.01)

(56) References Cited

U.S. PATENT DOCUMENTS

| | | | |
|---|---|---|---|
| 2008/0033645 | A1 | 2/2008 | Levinson et al. |
| 2011/0208426 | A1 | 8/2011 | Zheng et al. |
| 2011/0208429 | A1 | 8/2011 | Zheng et al. |
| 2013/0151138 | A1 | 6/2013 | Lu |
| 2014/0122031 | A1 | 5/2014 | Lee |
| 2014/0375493 | A1* | 12/2014 | Weisenburger ......... G01S 19/48 342/357.3 |
| 2015/0045072 | A1* | 2/2015 | Chao ....................... G01S 19/42 455/456.6 |
| 2017/0242133 | A1* | 8/2017 | Yilmaz ................... G01S 19/26 |

OTHER PUBLICATIONS

Floros, G.; van der Zander, B.; Leibe, B., "OpenStreetSLAM: Global vehicle localization using OpenStreetMaps," in 2013 IEEE International Conference on Robotics and Automation (ICRA), pp. 1054-1059, May 6-10, 2013.

Merriaux, P.; Dupuis, Y.; Vasseur, P.; Savatier, X., "Wheel odometry-based car localization and tracking on vectorial map," in 2014 IEEE 17th International Conference on Intelligent Transportation Systems (ITSC), pp. 1890-1891, 811 Oct. 2014.

Parra Alonso, et al., "Accurate Global Localization Using Visual Odometry and Digital Maps on Urban Environments," Intelligent Transportation Systems, IEEE Transactions on, vol. 13, No. 4, pp. 1535-1545, Dec. 2012.

Civera et al., "1-Point RANSAC for EKF Filtering. Application to Real-Time Structure from Motion and Visual Odometry," 2009 IEEE/RSJ International Conference on Intelligent Robots and Systems, St. Louis, MO, 2009, pp. 3498-3504.

Clement et al., "The Battle for Filter Supremacy: A Comparative Study of the Multi-State Constraint Kalman Filter and the Sliding Window Filter," Computer and Robot Vision (CRV), 2015 12th Conference on, Halifax, NS, 2015, pp. 23-30.

Dong et al., "Domain-Size Pooling in Local Descriptors: DSP-SIFT", In Proceedings of the IEEE Conference on Computer Vision and Pattern Recognition (CVPR), 2015.

Engel et al., "LDS-SLAM: Large-Scale Direct Monocular SLAM," Technical University Munich, 2014, pp. 1-16.

Hentschel et al., "Autonomous Robot Navigation Based on OpenStreetMap Geodata," Intelligent Transportation Systems (ITSC), 2010 13th International IEEE Conference on, Funchal, 2010, pp. 1645-1650.

Lategahn et al., "Visual SLAM for autonomous ground vehicles," Robotics and Automation (ICRA), 2011 IEEE International Conference on, Shanghai, 2011, pp. 1732-1737.

Mourikis et al., "A Multi-State Constraint Kalman Filter for Vision-aided Inertial Navigation," Proceedings 2007 IEEE International Conference on Robotics and Automation, Roma, 2007, pp. 3565-3572.

Ovrén et al., "Gyroscope-based video stabilisation with auto-calibration," 2015 IEEE International Conference on Robotics and Automation (ICRA), Seattle, WA, 2015, pp. 2090-2097.

Paul et al., "FAB-MAP 3D: Topological mapping with spatial and visual appearance," Robotics and Automation (ICRA), 2010 IEEE International Conference on, Anchorage, AK, 2010, pp. 2649-2656.

Senlet et al., "A Framework for Global Vehicle Localization Using Stereo Images and Satellite and Road Maps," Computer Vision Workshops (ICCV Workshops), 2011 IEEE International Conference on, Barcelona, 2011, pp. 2034-2041.

Strelow et al., "Motion Estimation from Image and Inertial Measurements," The International Journal of Robotics Research, vol. 23, No. 12, Dec. 2014, pp. 1157-1195.

Vaca-Castano et al., "City Scale Geo-Spatial Trajectory Estimation of a Moving Camera," IEEE, 2012, pp. 1186-1193.

International Search Report and Written Opinion in corresponding International Application No. PCT/US2017/018308, dated Apr. 25, 2017 (11 pages).

* cited by examiner

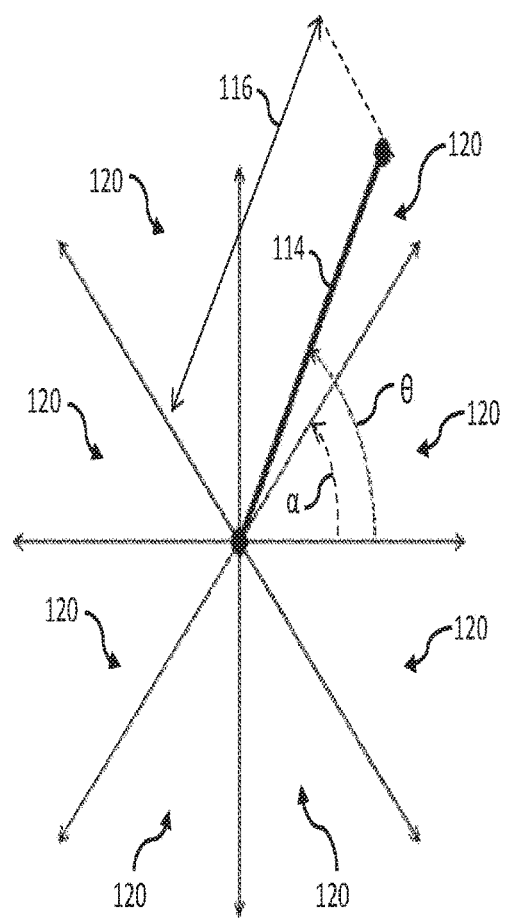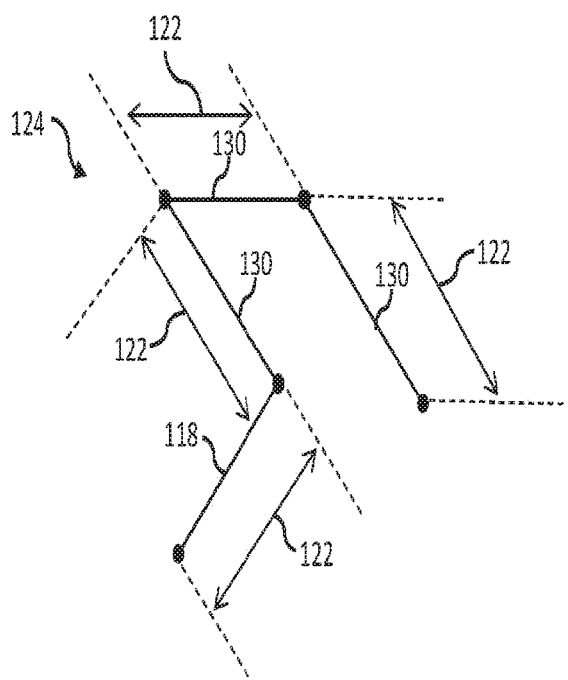
FIG. 4
FIG. 5

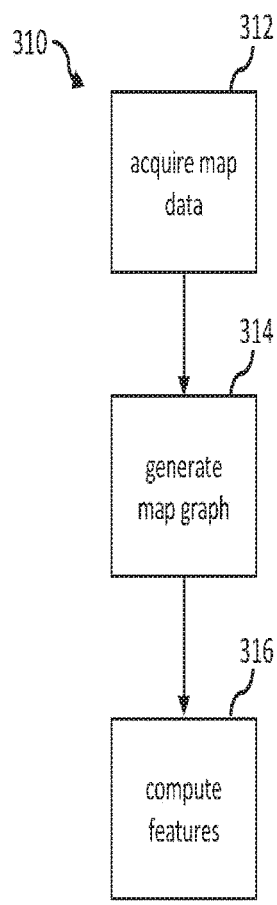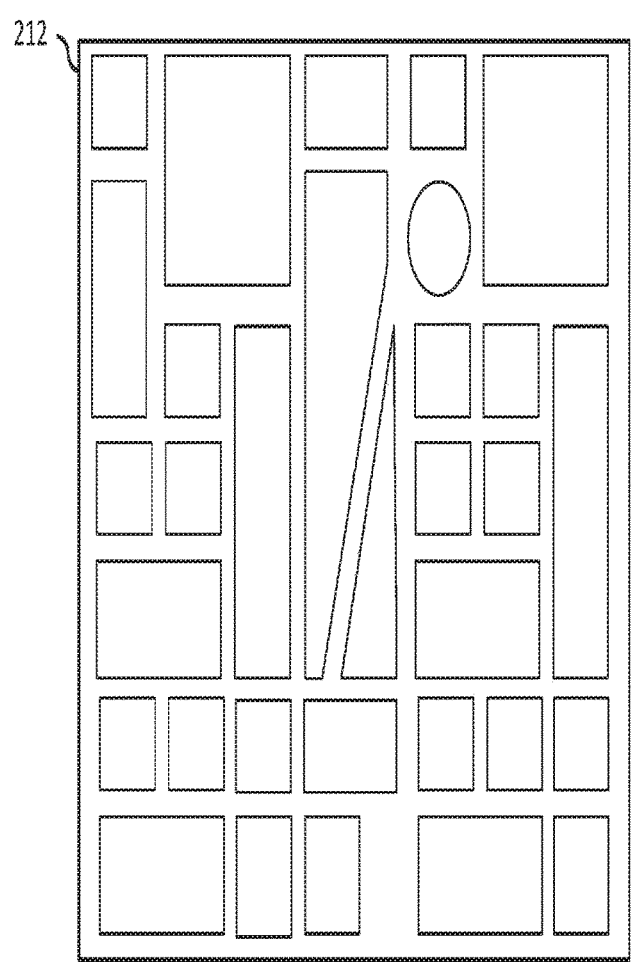
FIG. 7
FIG. 8

SYSTEMS, METHODS, AND DEVICES FOR GEO-LOCALIZATION

GOVERNMENT LICENSE RIGHTS

This invention was made with government support under contract number GRT00030666 and funding document number NIB8G13150AS02 awarded by the National Geospatial Intelligence Agency. The government has certain rights in the invention.

CROSS REFERENCE TO RELATED APPLICATIONS

This application claims priority to U.S. Non-Provisional patent application Ser. No. 15/048,285, entitled "SYSTEMS, METHODS, AND DEVICES FOR GEO-LOCALIZATION" filed Feb. 19, 2016. The entire contents of this application is incorporated by reference herein in its entirety.

BACKGROUND

The present specification generally relates to systems, methods, and devices for geo-localization and, more specifically, to systems, methods, and devices for topology based geo-localization.

Unless otherwise indicated herein, the materials described in this section are not prior art to the claims in this application and are not admitted to be prior art by inclusion in this section.

The increasing availability of mobile devices having global positioning system (GPS) based navigation solutions demonstrate the growing importance of geo-localization and navigation. However, the navigation solutions currently in the market place are reliant upon the quality of GPS signals. In many places such as city centers with high-rise buildings or forests, GPS signals can be degraded beyond usefulness. Moreover, GPS signals are low powered and can easily be jammed, which can reduce the usefulness of such solutions in military operations. Furthermore, GPS signals do not work indoors, i.e., GPS based navigation cannot be relied on for navigation within a building.

Additionally, autonomous navigation is an emerging technology reliant upon geo-localization. However, autonomous navigation requires accurate geo-localization in real-time to effectively navigate. The accuracy of standard GPS devices is unacceptably poor for the purposes of autonomous navigation.

Accordingly, a need exists for alternative systems, methods, and devices for geo-localization.

SUMMARY

In one embodiment a trajectory determination device for geo-localization can include one or more relative position sensors, one or more processors, and memory. The one or more relative position sensors can generate relative position signals. The one or more processors can be communicatively coupled to the one or more relative position sensors and the memory. The memory can store machine readable instructions. The one or more processors can execute the machine readable instructions to receive the relative position signals from the one or more relative position sensors. The relative position signals can be transformed into a sequence of relative trajectories. Each of the relative trajectories can include a distance and directional information indicative of a change in orientation of the trajectory determination device. A progressive topology can be created based upon the sequence of relative trajectories; this progressive topology can be compared to map data. A geolocation of the trajectory determination device can be determined.

In another embodiment, a method for geo-localization can include identifying a region of interest. A trajectory determination device can be located within the region of interest. The trajectory determination device can include one or more relative position sensors that generate relative position signals. A subset of map data corresponding to the region of interest can be selected. The subset of the map data can be transformed into a map graph. The map graph can include nodes and edges. Features can be computed as rate of change of in angles between pairs of edges of the map graph at each node of the map graph. The features can be stored at each node of the map graph. One or more processors can automatically generate a progressive topology based upon the relative position signals. The progressive topology can correspond to a shape of movement of the trajectory determination device. The one or more processors can automatically compare the features of the map graph to the progressive topology to determine a geolocation of the trajectory determination device.

In yet another embodiment a trajectory determination device for geo-localization can include one or more relative position sensors, a global positioning system receiver, one or more processors, and memory. The one or more relative position sensors can generate relative position signals. The global positioning system receiver can provide signals indicative of a location of the trajectory determination device. The one or more processors can be communicatively coupled to the one or more relative position sensors and the memory. The memory can store machine readable instructions. The one or more processors can execute the machine readable instructions access map data corresponding to the location of the trajectory determination device. The relative position signals can be received from the one or more relative position sensors. The relative position signals can be transformed into a sequence of relative trajectories. Each of the relative trajectories can include a distance and directional information indicative of a change in orientation of the trajectory determination device. A progressive topology can be created based upon the sequence of relative trajectories; this progressive topology can be compared to map data. A geolocation of the trajectory determination device can be determined.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 schematically depicts quantization of a trajectory according to one or more embodiments shown and described herein;

FIG. 5 schematically depicts a progressive topology according to one or more embodiments shown and described herein;

FIG. 7 schematically depicts a method for calculating progressive topology according to one or more embodiments shown and described herein;

FIG. 8 schematically depicts map graph according to one or more embodiments shown and described herein;

DETAILED DESCRIPTION

Figure 1:
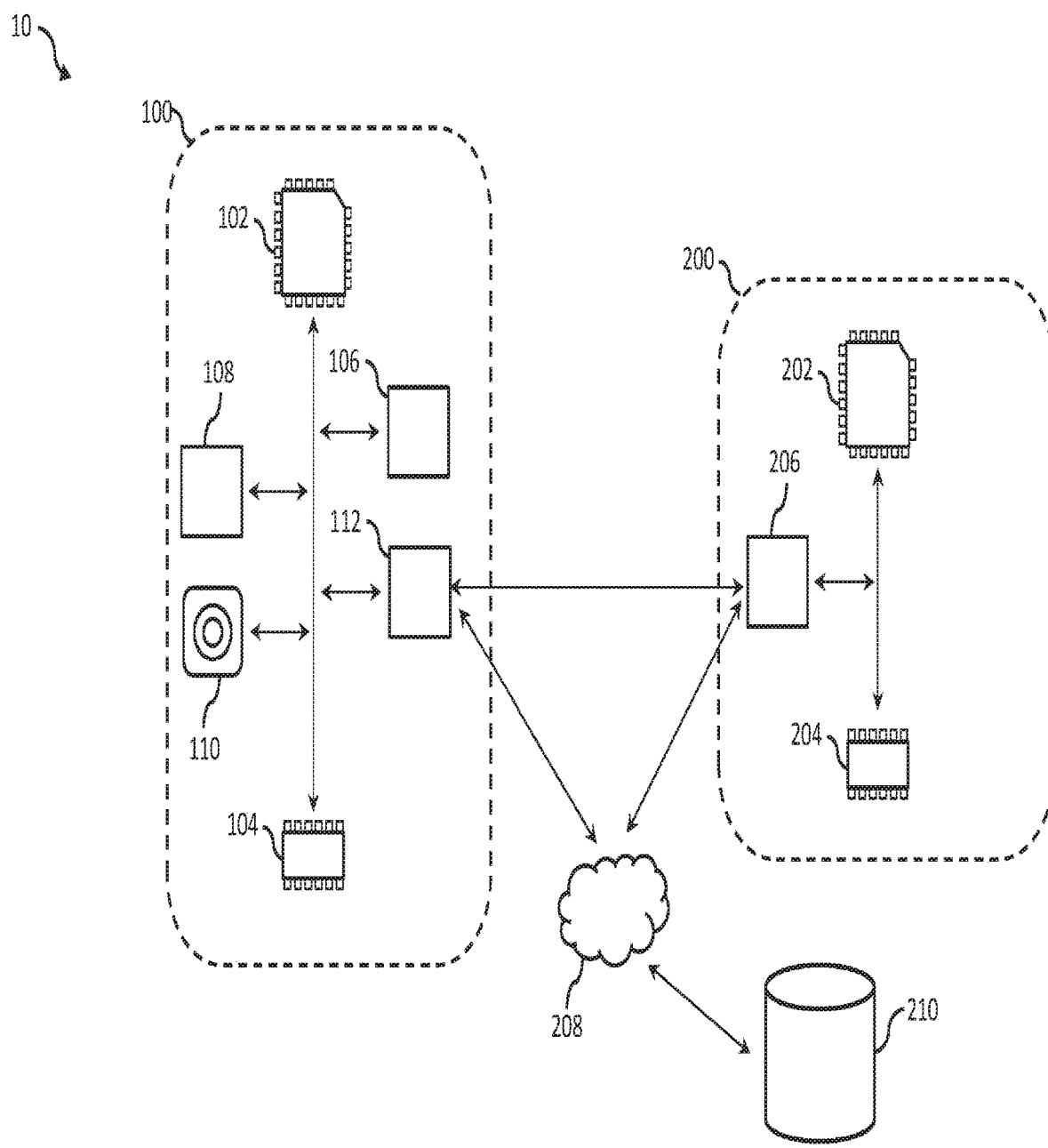
FIG. 1 schematically depicts a system for geo-localization according to one or more embodiments shown and described herein.

FIG. 1 generally depicts one embodiment of a system for geo-localization that localizes a trajectory determination device. The trajectory determination device generally comprises one or more processors communicatively coupled to memory and one or more relative position sensors. The one or more processors can execute machine readable instructions to determine a progressive topology using data from the relative position sensors. The progressive topology can be compared to map data to determine a geolocation of the trajectory determination device. Various embodiments of the system, the trajectory determination device and their operation will be described in more detail herein.

Referring now to FIG. 1, a system 10 for geo-localization comprising a trajectory determination device 100 is schematically depicted. The system 10 can be configured to localize the trajectory determination device 100 within an environment. The trajectory determination device 100 can be configured to determine relative trajectories. In some embodiments, the trajectory determination device 100 can comprise one or more processors 102 for executing machine readable instructions to perform functions according to the methods described herein. As used herein, the term "processor" can mean any device capable of executing machine readable instructions. Accordingly, each processor can be a controller, an integrated circuit, a microchip, or any other device capable of implementing logic.

The trajectory determination device 100 can comprise memory 104 communicatively coupled to the one or more processors 102 (generally depicted as double arrowed lines). The memory 104 described herein may be RAM, ROM, a flash memory, a hard drive, or any device capable of storing machine readable instructions. Additionally, it is noted that the functions, modules, and processes described herein can be provided as machine readable instructions stored on the memory 104 and executed by the one or more processors 102. The machine readable instructions can be provided in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein may be implemented in any conventional computer programming language, as pre-programmed hardware elements, or as a combination of hardware and software components (e.g., firmware components).

The trajectory determination device 100 can comprise one or more relative position sensors 106 configured to provide relative position signals indicative of the relative position of the trajectory determination device 100 with respect to a prior position of the trajectory determination device 100. It is noted that the term "sensor," as used herein, means a device that measures a physical quantity and converts it into an electrical signal, which is correlated to the measured value of the physical quantity. Furthermore, the term "signal" means a waveform (e.g., electrical, optical, magnetic, or electromagnetic), such as DC, AC, sinusoidal-wave, triangular-wave, square-wave, and the like, capable of traveling through a medium.

In some embodiments, the one or more relative position sensors 106 can comprise an inertial measurement unit (IMU) configured to provide orientation signals indicative of the orientation of the trajectory determination device 100. The IMU sensor can comprise an accelerometer, a gyroscope and a magnetometer, which can each provide 3-axis data. Each component of the IMU can be provided as a separate component or as a system in a package that integrates the accelerometer, the gyroscope and the magnetometer. Alternatively or additionally, one or more of the components of the IMU can be omitted. For example, the one or more relative position sensors 106 can comprise the accelerometer, the gyroscope and the magnetometer without the other ones of the accelerometer, the gyroscope and the magnetometer. Additionally, the one or more relative position sensors 106 omit only one of the accelerometer, the gyroscope and the magnetometer. Alternatively or additionally, the one or more relative position sensors 106 can comprise a barometer or pressure altimeter configured to provide signals indicative of the atmospheric pressure ambient to the trajectory determination device 100.

Referring still to FIG. 1, the trajectory determination device 100 can comprise a Global Positioning System (GPS) receiver 108 communicatively coupled to the one or more processors 102. The GPS receiver 108 can be configured to provide signals indicative of the location of the trajectory determination device 100. Specifically, the GPS receiver 108 can receive signals encoded with location data, time data or both from a plurality of GPS satellites, when the GPS receiver 108 has an unobstructed line of sight to the GPS satellites.

According to the embodiments described herein, the trajectory determination device 100 can comprise an optical sensor 110 communicatively coupled to the one or more processors 102 for detecting optical signals and encoding the detected signals into an image or collection of images (e.g., video). It should be understood that the term "optical" can refer to various wavelengths of the electromagnetic spectrum such as, but not limited to, wavelengths in the ultraviolet (UV), infrared (IR), and visible portions of the electromagnetic spectrum. In some embodiments, the optical sensor 110 can comprise semiconductor charge-coupled devices (CCD), complementary metal-oxide-semiconductors (CMOS), N-type metal-oxide-semiconductors (NMOS), or the like. Accordingly, one or more images can be captured by the optical sensor 110 and stored in the memory 104.

The trajectory determination device 100 can comprise communication hardware 112 communicatively coupled to the one or more processors 102 for communicatively coupling the trajectory determination device 100 to another device via a direct link or a network such as, for example, a wide area network, a local area network, personal area network, and combinations thereof. Accordingly, the communication hardware 112 can be configured to communicate, i.e., send and/or receive data signals via any wired or wireless communication protocol. For example, the communication hardware 112 can comprise an antenna, a modem, LAN port, wireless fidelity (Wi-Fi) card, WiMax card, near-field communication hardware, satellite communication hardware, or the like. Accordingly, the trajectory determination device 100 can be communicatively coupled to a network via wires, via a wide area network, via a local area network, via a personal area network, via a satellite network, or the like. Suitable local area networks can comprise wired ethernet and/or wireless technologies such as, for example, Wi-Fi. Suitable personal area networks can comprise wireless technologies such as, for example, IrDA, BLUETOOTH, Wireless USB, Z-WAVE, ZIGBEE, or the like. Alternatively or additionally, suitable personal area networks may include wired computer buses such as, for example, USB and FIREWIRE.

Alternatively or additionally, the communication hardware 112 can comprise radio frequency hardware (RF hardware) communicatively coupled to the one or more processors 102 for communicatively coupling the trajectory determination device 100 with a cellular network. Suitable cellular networks include, but are not limited to, technologies such as LTE, WiMAX, UMTS, CDMA, and GSM. In some embodiments, the RF hardware can comprise components suitable for communicating voice information and data signals such as, for example, modems, attenuators, antennas, antenna switches, amplifiers, receivers, transceivers, or combinations thereof.

Figure 2:
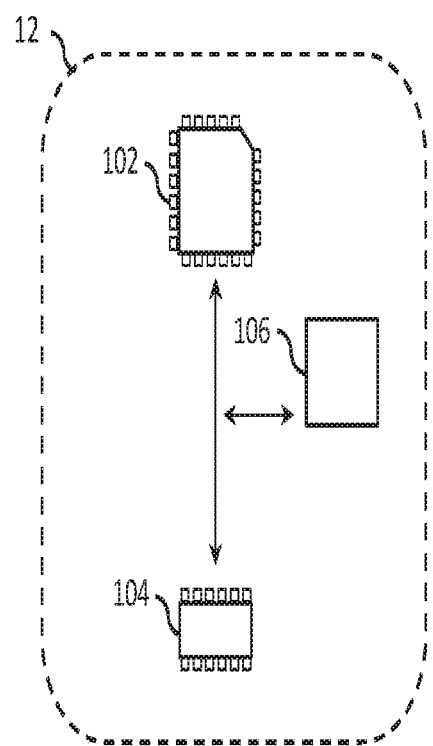
FIG. 2 schematically depicts a trajectory determination device according to one or more embodiments shown and described herein.

Referring collectively to FIGS. 1 and 2, the trajectory determination device 100 can be implemented as a mobile device such as, for example, a smart phone, a tablet, or a smartwatch. The mobile device can implement a mobile operating system as machine readable instructions stored on the memory 104 and executed by the one or more processors 102. Specific examples of mobile operating systems include, but are not limited to, Android, iOS, Blackberry OS, Windows Phone, Symbian, Android Wear, Pebble OS, Watch OS, and the like. In some embodiments, the GPS receiver 108, the optical sensor 110, the communication hardware 112, or a combination thereof can be omitted from the trajectory determination device 100. For example, a trajectory determination device 12 can comprise one or more processors 102 communicatively coupled to memory 104 and the one or more relative position sensors 106. As is explained in greater detail herein, the methods and processes described herein can provide geolocation information in a computationally efficient manner. Accordingly, the methods and processes can be executed with the trajectory determination device 12 as a relatively small and relatively low powered wearable device.

Referring again to FIG. 1, the system 10 can comprise a map graphing device 200 configured to provide an graph abstraction of map data 210. The map graphing device 200 can comprise one or more processors 202 communicatively coupled to memory 204 and communication hardware 206. In some embodiments, the communication hardware 206 of the map graphing device 200 can be networked with the communication hardware 112 of the trajectory determination device 100. Alternatively or additionally, the communication hardware 206 of the map graphing device 200 can be networked with the communication hardware 112 of the trajectory determination device 100 via the internet 208.

Figure 3:
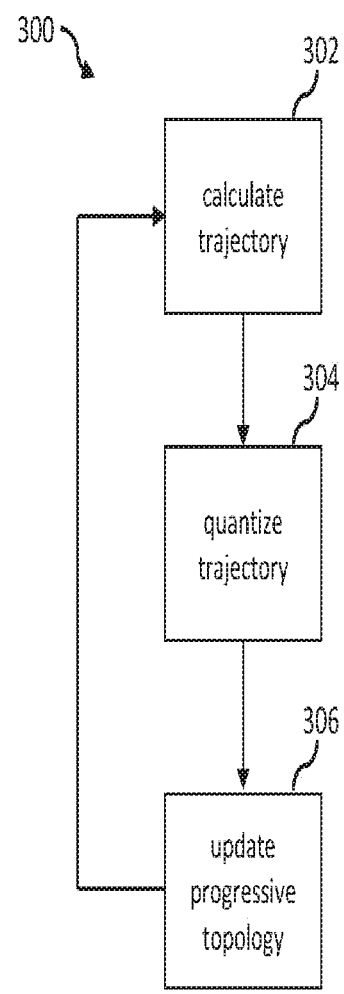
FIG. 3 schematically depicts a method for calculating progressive topology according to one or more embodiments shown and described herein.

Referring collectively to FIGS. 1, 3 and 4, a method 300 for calculating progressive topology can be provided on memory 104 and executed by the one or more processors 102. The method 300 can comprise a process 302 for calculating a relative trajectory 114. At process 302, the one or more processors 104 can receive relative position signals from the one or more relative position sensors 106. For example, the one or more relative position sensors 106 can be configured to provide relative position signals at a predetermined sample rate such as, for example, at least about 15 Hz in one embodiment, at least about 30 Hz in another embodiment, or at least about 50 Hz in a further embodiment. The one or more processors 104 can execute a fusion algorithm to transform relative position signals into a relative trajectory 114. Suitable fusion algorithms include, but are not limited to, Bayesian Networks, hidden Markov models, Kalman filters, and the like. The relative trajectory 114 can comprise a distance 116 and directional information $\theta$ that are indicative of the change in orientation from the previous position of the trajectory determination device 100. Over multiple iterations, movement of the trajectory determination device 100 over time can be described by a sequence of multiple instances of the relative trajectory 114.

Referring collectively to FIGS. 1, 3, 4, and 5, the method 300 can comprise a process 304 for quantizing the relative trajectory 114. At process 304, the one or more processors 104 can transform the relative trajectory 114 into a trajectory descriptor 118. The trajectory descriptor 118 can be selected from a plurality of discrete bins 120 that are organized according to properties of the relative trajectory 114. Specifically, each bin 120 can assign a range of angles to a discrete angle $\alpha$. When the directional information $\theta$ of the relative trajectory 114 falls within the range of angles, the relative trajectory 114 can be transformed into the trajectory descriptor 118 comprising the discrete angle $\alpha$ that corresponds to the range of angles. Accordingly, the trajectory descriptor 118 can encode the relative trajectory 114 based upon angle.

It is noted that, while FIG. 4 depicts eight bins 120, the embodiments provided herein can be encoded using any desired quantity of bins 120. Indeed, the quantity of bins 120, i.e., quantization level, can impact sensitivity to motion of the trajectory determination device 100 and can impact the effect of noise. For example, a relatively small quantity of bins 120 can decrease sensitivity to motion and noise, and a relatively large quantity of bins 120 can increase sensitivity to motion and noise. Experimental results demonstrated that a quantity of about seventy-two of the bins 120 produced a trajectory descriptor 118 with good sensitivity to motion and robustness to noise. It is noted that the trajectory descriptors 118 described herein can improve scalability, can improve storage efficiency, and can improve computational efficiency compared to other trajectory descriptors. As is explained in greater detail herein, topology based searching can be more computationally efficient using the trajectory descriptors 118 described herein. Conversely, trajectory descriptors with inbuilt invariance and other features can have relatively high computational and storage cost.

Alternatively or additionally, the relative trajectory 114 can be quantized using sampling distances 122 that are substantially uniform. Specifically, the trajectory descriptor 118 can be updated when the distance 116 of the relative trajectory 114 from the previous relative trajectory is substantially equal to the sampling distance 122. Accordingly, the trajectory descriptor 118 can be associated with the sampling distance 122. The sampling distance 122 can impact sensitivity of the trajectory descriptor 118 to motion of the trajectory determination device 100 and the scalability of the system 10. For example, if the sampling distance 122 is relatively short, the trajectory descriptor 118 can detect relatively rapid motion (e.g., swerve, lane-change and overtaking motion of a car), and can be relatively computationally inefficient, which can be in part due to increased sensitivity to noise. If the sampling distance 122 is relatively long, the trajectory descriptor 118 can lack sensitivity to rapid motion, and be relatively computationally efficient, which can be in part due to decreased sensitivity to noise. It is noted that the predetermined sample rate of the one or more relative position sensors 106 can be set based upon the rate of change of the position of the trajectory determination device 100 and the sampling distance 122. Specifically, the predetermined sample rate can be sufficient to capture the sampling distance 122 within a velocity range of the trajectory determination device 100, i.e., lower rates can be suitable when the trajectory determination device 100 is detecting human motion compared to when the trajectory determination device 100 is detecting vehicle motion.

Figure 6:
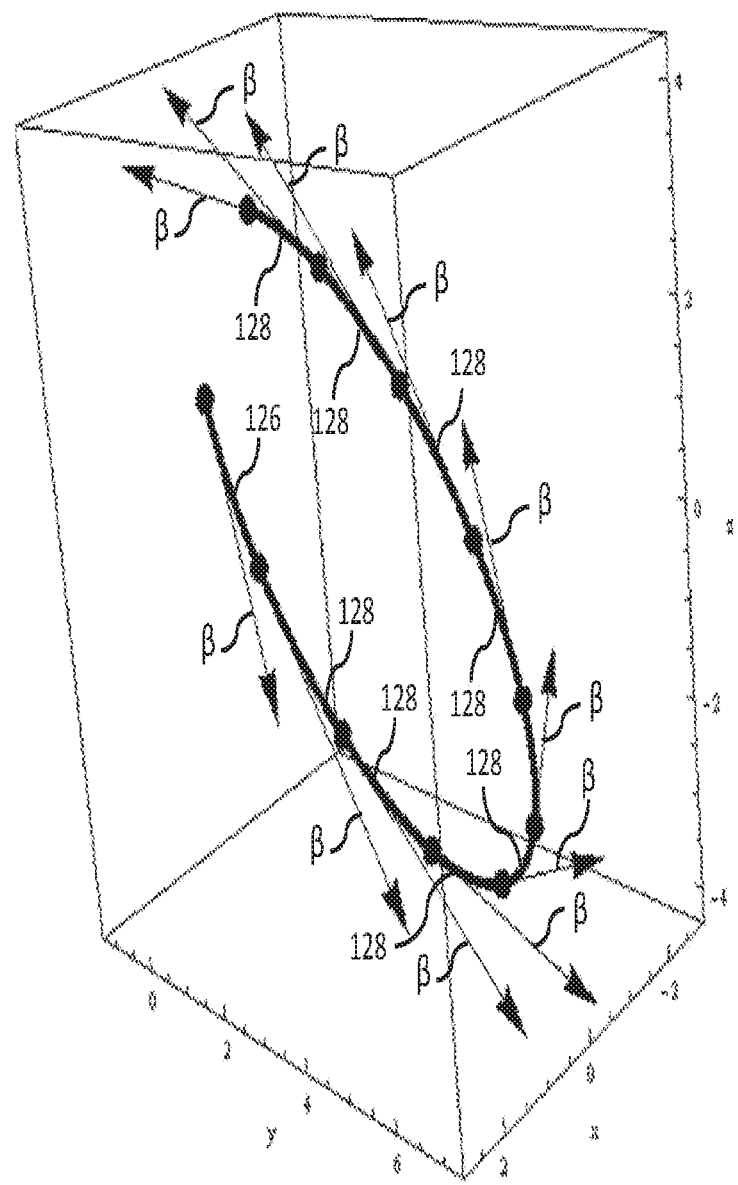
FIG. 6 schematically depicts quantization of a trajectory according to one or more embodiments shown and described herein.

Referring collectively to FIGS. 1, 4, and 6, the embodiments described herein can be extended to further dimensions beyond the two-dimensional (2D) case described above. For a relative trajectory 126 corresponding to three-dimensional (3D) motion of trajectory determination device 100, the relative trajectory 126 can be quantized into the trajectory descriptor 118 using angle information corresponding to 3D motion. Specifically, the trajectory descriptor 118 can be encoded according to discrete bins corresponding to a contour tangent angle β of the relative trajectory 126. Likewise, each subsequent relative trajectory 128 can be can be encoded according the corresponding contour tangent angle β.

Referring collectively to FIGS. 1, 3, and 5, the method 300 can comprise a process 306 for updating a progressive topology 124. At process 304, the one or more processors 104 can generate the progressive topology 124 by joining the trajectory descriptor 118 with subsequent trajectory descriptors 130. For example, as the trajectory determination device 100 moves, the method 300 can iterate to grow the progressive topology 124 to mimic the shape of the movement. Thus, the progressive topology 124 can provide a geometric representation corresponding to the shape of the movement. In some embodiments, the progressive topology 124 can be represented by a topology $T=\{P_1, P_2, \ldots, P_n\}$ having points separated by the sampling distance 122. As is described in greater detail herein, the progressive topology 124 can be compared to map data 210 to determine the geolocation of the trajectory determination device 100.

Referring collectively to FIGS. 1 and 7, a method 310 for generating a graph representation of map data 210 can be provided on memory 204 and executed by the one or more processors 202. The method 310 can comprise a process 312 for acquiring the map data 210. At process 302, an initial hypothesis of a region of interest can be provided. Generally, the location of the trajectory determination device 100 should be at some position within the region of interest. The region of interest can be scaled to any size, and should be large enough to account for errors in the hypothesis. For example, the region of interest can be the size of a building or a neighborhood within a municipality, where an accurate region of interest can be provided (e.g., via GPS or user input). For some use cases, the region of interest can be a political state, city sized area, or the size of the entire world, though computational complexity increases in scale with a larger region of interest.

The region of interest can be utilized to select a subset of the map data 210. In some embodiments, the map data 210 can be provided via the internet 208. For example, the map data 210 can comprise OpenStreetMap (OSM) databases, Geographic Information Systems (GIS) databases, Building Information Model (BIM) databases, or any equivalent indoor and/or outdoor map data. For example, OSM data can be accessed via the corresponding website, and data corresponding to the region of interest can be selected by specifying a bounding box b in terms of longitude and latitude, $b=(lat_{min}, lon_{min}, lat_{max}, lon_{max})$. The acquired portion of the map data 210 can be provided in XML format and can be structured using three basic entities: nodes, ways and relations. The node n can represent a point element in the map data 210, which can be defined by GPS coordinates, longitude and latitude $n=(lat,lon)$. Linear and area elements can be represented by ways w, which can be defined as a collection of nodes $w=\{n_i\}_{i=1 \ldots k}$. The relations r can represent relationships between the aforementioned geometric entities to form more complicated structures. Alternatively or additionally, the map data 210 can be acquired from GIS databases in shapefiles format, i.e., a geospatial vector data format. Community contributed data sources like OSM may be updated frequently, whereas shapefile databases are comparatively better curated and updated more infrequently. The choice of data source can depend on the region of interest and the current state of respective maps of that region. In addition, it is noted poorly curated data can generate registration errors and noise, which can make geo-localization more difficult.

Referring collectively to FIGS. 1, 7, and 8, the method 310 can comprise a process 314 for generating a map graph 212. For example, in embodiments where the geolocation is dependent upon travel upon roads, the map graph 212 can comprise a road network graph of the roads in the region of interest from the map data 210. For example, roads can be modeled as ways w in the GIS data. Accordingly, the ways w can be extracted from the XML data to form the map graph 212. It is noted that, while certain embodiments are described with respect to road networks, the embodiments provided herein can be utilized for localization of any type of map data corresponding to components of a viable travel path.

Figure 9:
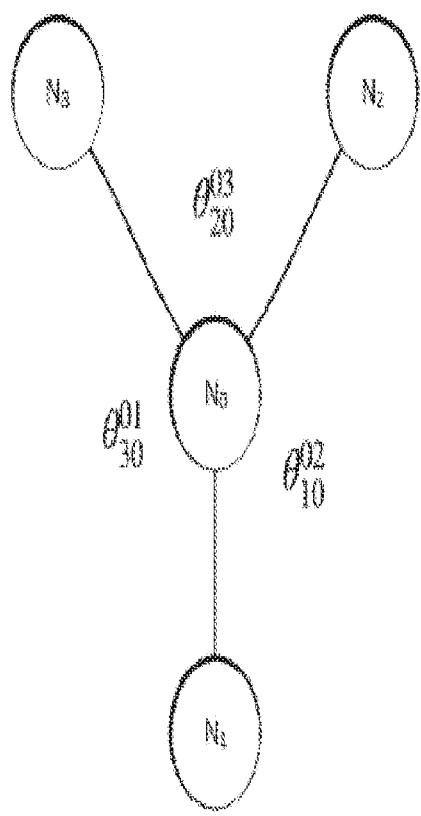
FIG. 9 schematically depicts feature extraction of a map graph according to one or more embodiments shown and described herein.

Referring collectively to FIGS. 7, 8, and 9, the method 310 can comprise a process 316 for determining features of the map graph 212. Features for the map graph 212 can be computed as angles between each pair of edges at each node $N_0$ with its neighbors $N=\{N_1, N_2, N_3\}$, or rate of change of angles between each pair of edges at each node $N_0$ with its neighbors $N=\{N_1, N_2, N_3\}$. The features $[\theta_{10}{}^{02}, \theta_{20}{}^{03}, \theta_{30}{}^{01}]$ can be stored at each node of the map graph 212.

Referring collectively to FIGS. 1, 5, 8, and 10, a method 320 for determining a geolocation of the trajectory determination device 100 can be provided on memory 104 and executed by the one or more processors 102. The method 320 can be configured to find the progressive topology 124 in the map graph 212. In some embodiments, the geolocation can be determined by solving a sub-graph matching problem, where a graph of the progressive topology 124 of the trajectory determination device 100 traveling on roads of the map data 210 can be treated as a subgraph of the map graph 212.

The method 320 can comprise a process 322 for computing features of the progressive topology 124. At process 322, the progressive topology 124 can be abstracted as a trajectory graph $G_\tau$. Features that are substantially equivalent to the features of the map graph 212 can be computed for the trajectory graph $G_\tau$. The computed features can be stored at the nodes, the edges, or both of the trajectory graph $G_\tau$. In order to facilitate a generalized solution that does not require knowledge of geographic coordinates or global direction information of trajectory determination device 100, the progressive topology 124 can be treated as a sequence of points with a relative distance measure.

Figure 11:
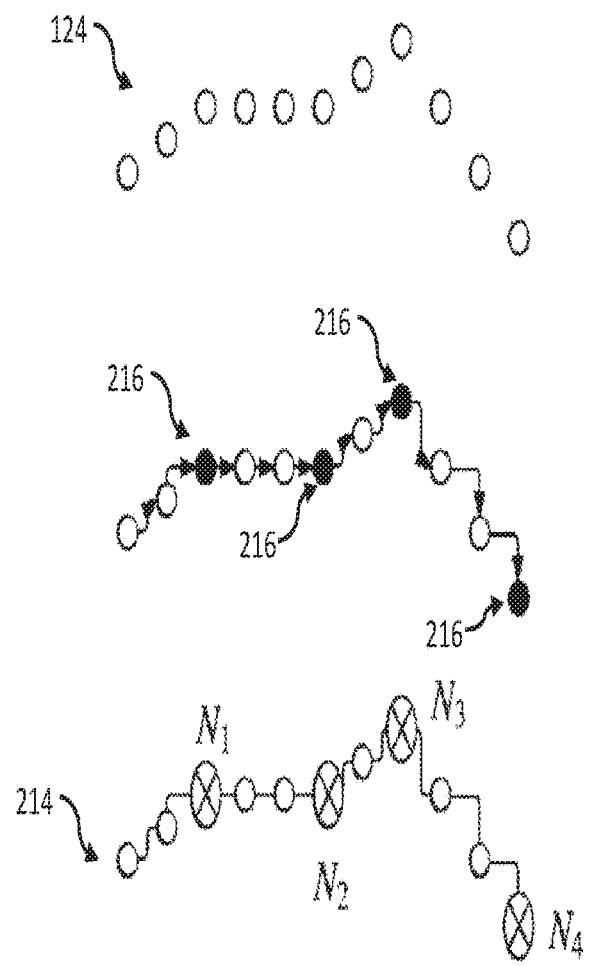
FIG. 11 schematically depicts a spline approximation of a progressive topology according to one or more embodiments shown and described herein.

Referring now to FIG. 11, the progressive topology 124 is depicted as a set of points. Accordingly, the trajectory graph $G_\tau$ can be encoded from the progressive topology 124 as a spline approximation 214 of the acquired sequence of points of the progressive trajectory 124. Points of the progressive topology 124 with significant change in contour angle can be selected as control points 216. The trajectory graph $G_\tau$ abstracted from the progressive topology 124 can be created using the using the control points 126 as nodes of the trajectory graph $G_\tau$ and the points between control points 126 as edges of the trajectory graph $G_\tau$.

Figure 10:
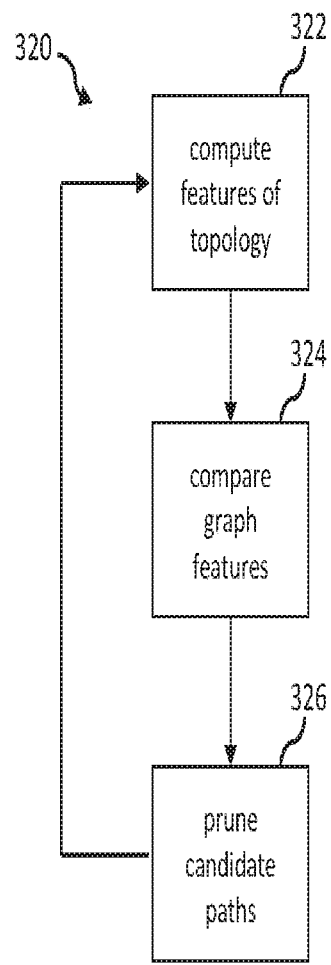
FIG. 10 schematically depicts a method for determining geolocation according to one or more embodiments shown and described herein.

Referring collectively to FIGS. 1, 8, and 10, the method 320 can comprise a process 324 for comparing features of the graph abstractions. Specifically, the features of the map graph 212 and the features of the trajectory graph $G_\tau$ can be used to compute a similarity score between trajectory graph $G_\tau$ and a path graph $G_P$, which is a hypothesis of a matching sub-graph of the map graph 212. In embodiments where the trajectory determination device 100 travels on the road network corresponding to the map graph 212, the trajectory graph $G_\tau$ can be assumed to be a sub-graph of the map graph 212, $G_\tau \subset G_M$. Searching for $G_\tau \subset G_M$ can be equivalent to a search for a sub-graph $G_P$ of $G_M$ such that the trajectory is similar to the path sub-graph $G_\tau \equiv G_P$. Accordingly, a similarity score $S(\cdot, \cdot)$ can be computed between the trajectory graph and path graph, $S(G_\tau, G_P) \forall G_P \subset G_M$, for all path graphs in the map graph 212. The best matching path graph can be given by Equation 1.

$$G_P^* \leftarrow \underset{G_P}{\operatorname{argmax}} S(G_\tau, G_P) \forall G_P \subset G_M \qquad \text{Equation 1}$$

In some embodiments, geo-localization is determined in real-time. Thus, the progressive topology 124 continuously grows with time and consequently the trajectory graph $G_\tau$ also grows with time. Thus, the search solution considers time, where best matching solution at time t can be given by Equation 2.

$$G_P^{(t)*} \leftarrow \underset{G_P^{(t)}}{\operatorname{argmax}} S(G_\tau^{(t)}, G_P^{(t)}) \forall G_P^{(t)} \subset G_M \qquad \text{Equation 2}$$

According to the embodiments described herein, the similarity score $S(\cdot,\cdot)$ can be computed using a sequence matching algorithm such as, for example, a sub-string matching algorithm, or the like. The trajectory graph $G_\tau^{(t)}$ can be a sequence of quantized edge-orientations, as described above. Additionally, each graph path $G_P$ can be similarly encoded as a sequence of quantized edge-orientations. Thus, string matching can be beneficial because partial matches can produce a reasonably good similarity score. Moreover, this formulation makes the similarity score $S(\cdot, \cdot)$ robust to noise, missing data, erroneous motion (e.g., swerving vehicle), and map registration flaws.

Figure 12A:
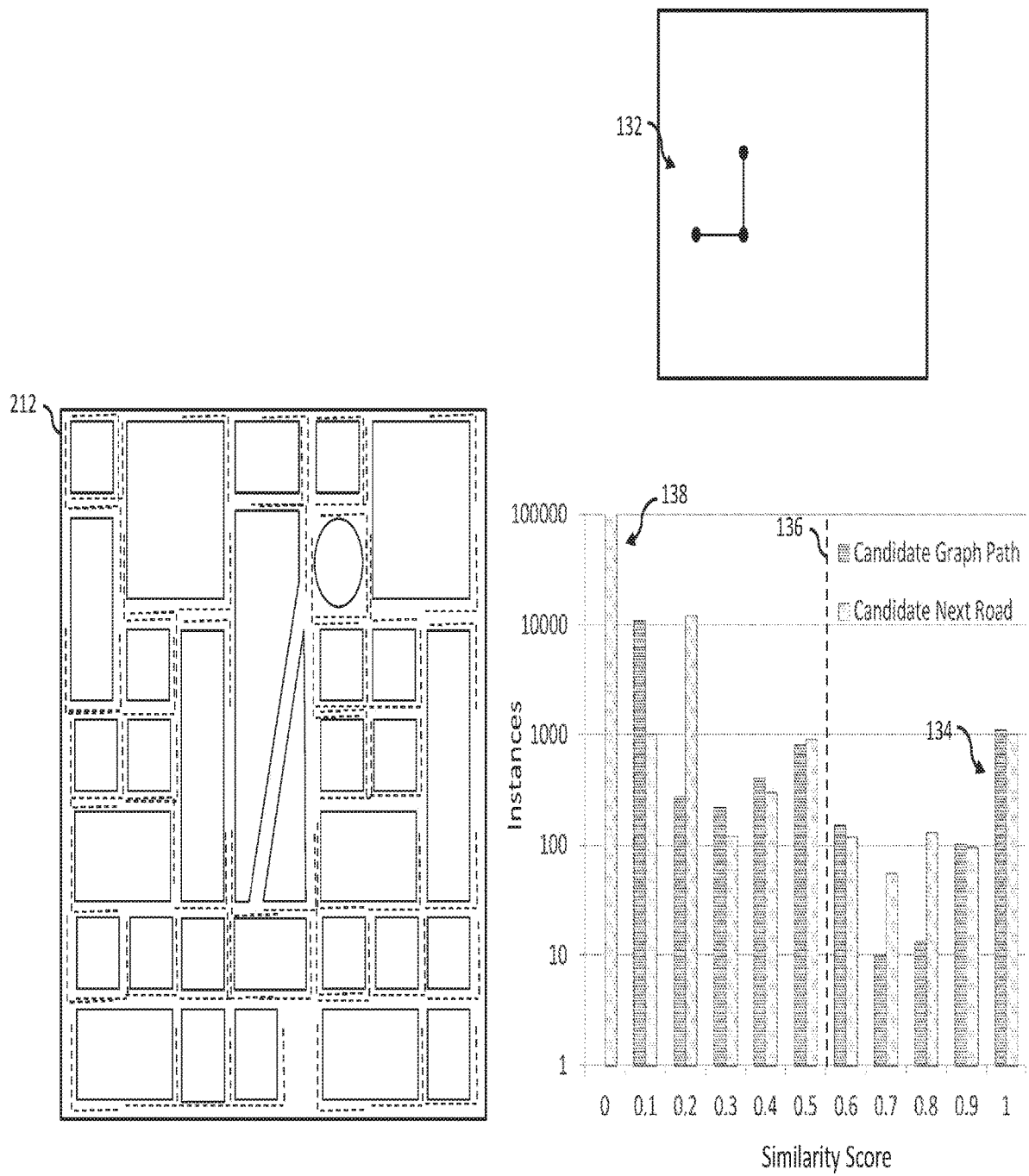
FIGS. 12A and 12B graphically depict similarity scoring of progressive topologies according to one or more embodiments shown and described herein.
Figure 12B:
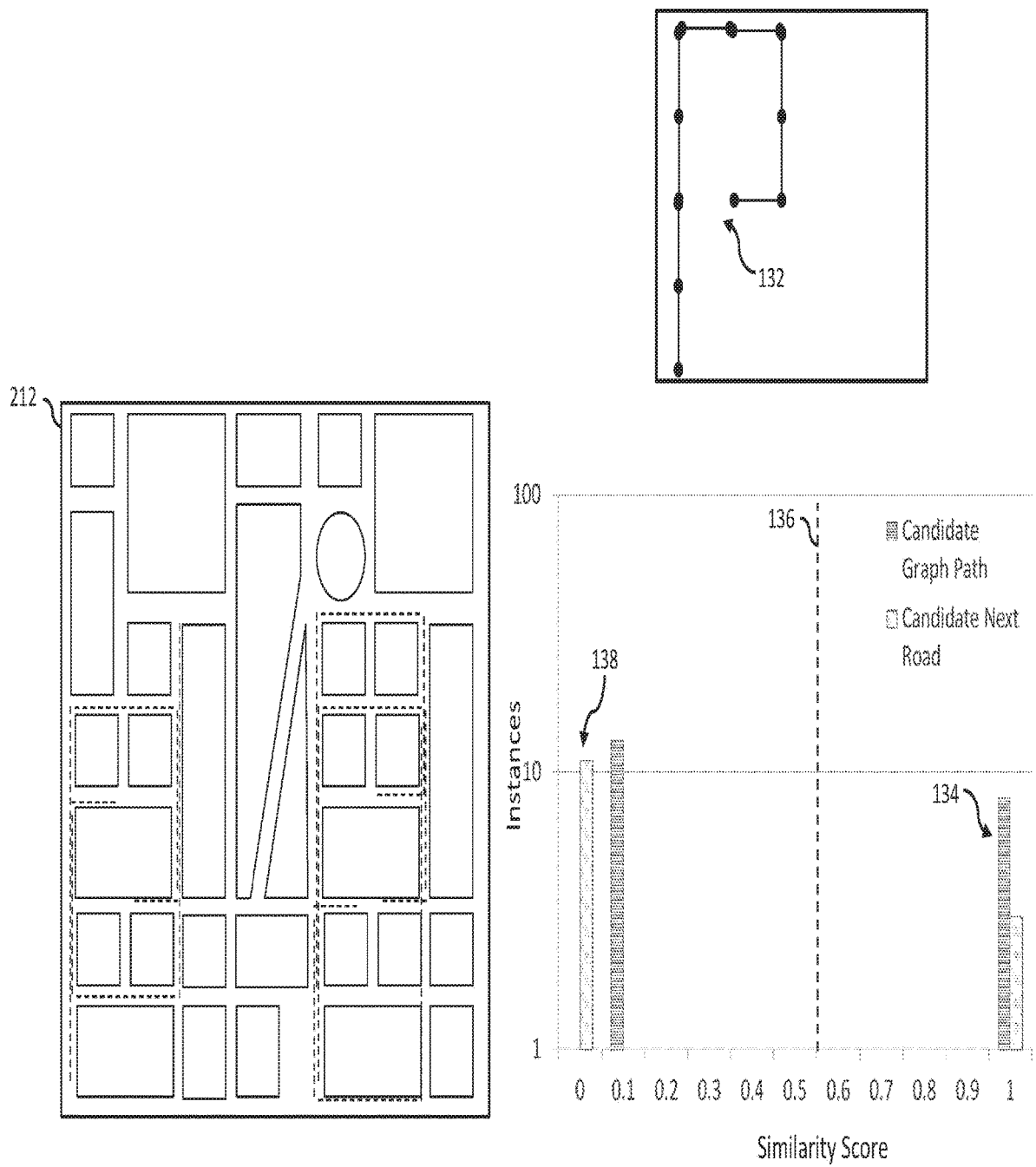

Referring collectively to FIGS. 1, 12A, and 12B, sequence matching for a progressive topology 132 that grows over time is graphically depicted. At time at time t1 (FIG. 12A), which corresponds an initial amount of movement of the trajectory determination device 100, the progressive topology 132 can be relatively short. Thus, the trajectory graph $G_\tau^{(t1)}$ can be relatively short. A similarity score 134 can be computed for each graph path $G_P$ that matches the trajectory graph $G_\tau^{(t1)}$, $S(G_\tau^{(t1)}, G_P)$. The similarity score 134 results are provided in FIG. 12A as a histogram showing number of matching instances and the value of the similarity score. The matching graph paths $G_P$ are depicted as dashed lines in the map graph 212. Since the progressive topology 132 is relatively short, the number of matching graph paths $G_P$ can be relatively large. At time at time t2 (FIG. 12B), the progressive topology 132 can grow. The trajectory graph $G_\tau^{(t2)}$ can also grow. Such growth can reduce the number of matching of matching graph paths $G_P$.

Referring collectively to FIGS. 1, 10, 12A, and 12B, the method 320 can comprise a process 326 for pruning matching graph paths $G_P$. In some embodiments, a threshold 136 can be utilized to prune the matching graph paths $G_P$. For example, matching graph paths $G_P$ having a similarity score 134 less than the threshold 136 can be pruned from the set of matching graph paths $G_P$. The method 320 can iterate until a single path with the highest similarity score remains, which can identify the geolocation of the trajectory determination device 100 in the map graph 212. It has been shown experimentally, that the amount of time or iterations needed to determine the geolocation can depend on the uniqueness of the trajectory and the nature of the map graph 212. Additionally, similarity scoring can be utilized for navigation. Specifically, a destination can be identified within the map graph 212. A similarity score 138 can be computed for candidate next roads that identify potential routes from matching graph paths $G_P$ to the destination. The candidate paths to the destination can converge in a manner substantially the same as the geolocation determination.

Referring collectively to FIGS. 1, 8, and 11, it is noted that the abstraction of the progressive topology 124 and map data 210 to graph structure can be based on the scale and frequency of occurrence of significant features. An analysis of the topology of the map data 210 can be conducted to improve the efficiency of implementation. The number and location of nodes and edges of map graph 212 abstracted from the map data 210 can be based on a degree of quantization that reduces the computational complexity and preserves the uniqueness of different edges. Accordingly, the uniqueness of the graph paths $G_P$ can be preserved and the search can converge to the best matching graph path $G_P$. In some embodiments, the map graph 212 can be characterized prior to the determination of the trajectory graph $G_\tau$. The map graph 212 can be classified such that certain feature types are characterized as being relatively unique to the map graphs 212. Accordingly, contour angles corresponding to unique angles compared to the map graph 212 can be selected as the control points 216. Alternatively or additionally, unique nodes or edges can be weighted higher in the similarity scoring. For example, a graph abstraction of Washington D.C. and Karlsruhe, Germany, may yield different types and quantities of node and edge structures. Specifically, Washington D.C. can correspond to a regular lattice grid structure, where the graph structure has edge lengths and orientations that are similar across several nodes in the graph. Accordingly, long and windy topology shapes can be relatively unique to the graph structure. In comparison, Karlsruhe, Germany has a semi-urban type of transport network with a spaghetti structure. Accordingly, regularly spaced and angular topology shapes can be relatively unique to the graph structure.

Referring collectively to FIGS. 1, 3, and 7, the relative position sensors 106 and the methods described herein can be used alone or in combination with other sensors for the determination of geolocation. In some embodiments, the relative position sensors 106 and the method 320 can be as a compliment to other sensors systems. For example, the relative position sensors 106 can be used for geolocation when the GPS receiver 108 is unable to communication with GPS satellites. At the time when the GPS signal is lost, the trajectory determination device 100 can be configured to "hand-off" geolocation determination to the relative position sensors 106 and the methods described herein. Specifically, the last location of the trajectory determination device 100 determined using the GPS receiver 108 can be utilized to set the region of interest. Accordingly, the trajectory determination device 100 can be used for seamless transitions from outdoors to indoors, or for navigation in GPS denied environments.

Alternatively, the relative position sensors 106 can used in combination with other sensors to improve the accuracy of the determination of geolocation. For example, optical sensor 110 and IMU measurements of the relative position sensors 106 can have benefits in combination. The relative position sensors 106 can continuously provide linear accelerations and rotational velocities, which can be integrated as the relative pose displacement. Such data can be reliable for relatively short time periods. Accordingly, the relative position sensors 106 can resolve drawbacks of using monocular visual odometry such as, for example, scale estimation, image blur due to rapid motion, and the requirement of continuously feature tracking. Moreover, IMU-based pose estimation can have drawbacks due to integrating IMU measurements. For example, noise and bias inherent in IMU measurements can be multiplied and cumulative after each integration. Thus, the noise and bias can cause pose drift to become unbounded over time. To overcome the drawbacks of the IMU drifting problem, the optical sensor 110 can be capable of detecting feature points in observed scenes and using the feature points as a pose constraint. In synergy, the relative position sensors 106 can provide a short-term reliable pose for optical sensors 110 to measure unknown features in the observed scenes as 3D landmarks.

Figure 13:
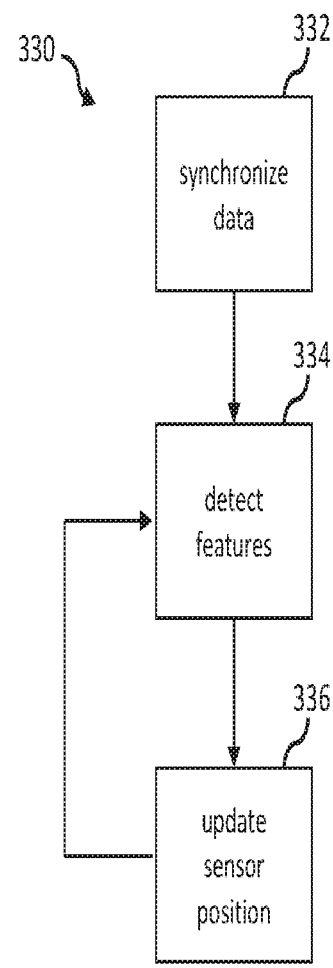
FIG. 13 schematically depicts a method for optical sensor pose trajectory-tracking according to one or more embodiments shown and described herein.

Referring collectively to FIGS. 1 and 13, the embodiments provided herein can comprise a method 330 for efficient optical sensor 110 pose trajectory-tracking. The method 330 can be configured to combine vision-based motion estimation and IMU measurements from the relative position sensors 106. The method 330 can comprise a process 332 for synchronizing data. At process 332, the IMU measurements can be decimated to synchronize with images from the optical sensor 110 with the same measurement frequency. Additionally, the IMU measurements can be smoothed or filtered to reduce noise.

The method 330 can comprise a process 334 for feature detection and tracking. At process 334, the initial pose of the optical sensor 110 can be determined using IMU measurements from the relative position sensors 106. For example, the initial pose can be determined using the topology based methods described herein above. Then, vision-based 3D point triangulation can be used to calculate feature points coordinates. The feature points can be extracted using optical feature detections algorithms such as, for example, Scale-invariant feature transform (SIFT). SIFT can be used as feature point descriptor, which reduces variability due to illumination while retaining discriminative power in the scale space.

After extracting feature points and the corresponding DSP-SIFT descriptors between subsequent images, a perspective homography constrain can be applied to filter outliers by mapping one image to another. 'Inliers' can be considered if the co-planar feature points between subsequent images are fully matched or within a small displacement. In one embodiment, the Random sample consensus (RANSAC) algorithm was applied to improve the homography transformation under the over-constrained degree of freedom problem. RANSAC can use iterative calculations to calculate parameters of homography matrix (8 DOF) from observations, and removed outliers from the matching process.

The method 330 can comprise a process 336 updating the position of the optical sensor 110. At process 336, after repeated measurement, reliable feature points can be used to update the position of the optical sensor 110 using an Extended Kalman Filter (EKF). A multi-state constraint EKF can be implemented to combine the IMU measurements from the relative position sensors 106 and monocular vision-based measurements from the optical sensor 110. The tracked pose of the optical sensor 110 can be provided based on the Earth-Centered, Earth-Fixed (ECEF) coordinates. The initial poses of the optical sensor 110 can be determined by the EKF propagating state and covariance, updated from multiple observed feature points. In embodiments with N camera poses are included in the EKF state at each time step k, the state and error state vectors can be determined with Equations 3-6.

$$\hat{X}_k[\hat{X}_{IMU,k}{}^T \hat{q}_{C_1G}{}^T \hat{p}_{C_1G}{}^T \hat{q}_{C_NG}{}^T \hat{p}_{C_NG}{}^T]^T \qquad \text{Equation 3}$$

$$\tilde{X}_k d=[\tilde{X}_{IMU,k}{}^T \delta\Theta_{C_1G}{}^T \tilde{p}_{C_1G}{}^T \ldots \delta\Theta_{C_NG}{}^T \tilde{p}_{C_NG}{}^T]^T \qquad \text{Equation 4}$$

$$X_{IMU,k}=[q_{IG,k}{}^T b_{g,k}{}^T b_{a,k}{}^T p_{IG,k}{}^T]^T \qquad \text{Equation 5}$$

$$\tilde{X}_{IMU}=[\delta\Theta_{I,k}{}^T \tilde{b}_{g,k}{}^T \tilde{b}_{a,k}{}^T \tilde{p}_{IG,k}{}^T]^T \qquad \text{Equation 6}$$

$q_{IG,k}$ is the unit quaternion representing the rotation from global frame G to the IMU frame I at time k. $P_{IG,k}$ is the IMU position with respect to global frame. $b_g$ and $b_a$ are the biases of gyroscope and accelerometer measurements, respectively. $\delta\Theta$ describes the attitude errors in a minimal representation. Accordingly, at time k, the full state of the EKF consists of the 13-dimensional IMU state and N×7-dimensional past poses of the optical sensor 110 in which active feature tracks were visible. In the propagation step, the filter propagation equations can be derived by discretization of the continuous-time IMU system model, the linearized continuous-time model is shown in Equation 7, where $n_{IMU}$ is the system noise. The covariance matrix of $n_{IMU}$ can be computed off-line during sensor calibration. The matrices F and G are the Jacobians; $I_3$ is 3×3 identity matrix; w and v are 3×3 rotational velocity and linear velocity matrix, respectively; $C_{IG}^T$ is the rotation matrix corresponding to $q_{IG}^T$.

$$\dot{X}_{IMU} = F\tilde{X}_{IMU} + Gn_{IMU} \qquad \text{Equation 7}$$

$$F = \begin{bmatrix} -\hat{w}^x & -I_3 & 0_{3\times3} & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \\ -\hat{C}_{IG}^T \hat{v}^x & 0_{3\times3} & -\hat{C}_{IG}^T & 0_{3\times3} \end{bmatrix} \qquad \text{Equation 8}$$

$$G = \begin{bmatrix} -I_3 & 0_{3\times3} & 0_{3\times3} & 0_{3\times3} \\ 0_{3\times3} & I_3 & 0_{3\times3} & 0_{3\times3} \\ 0_{3\times3} & 0_{3\times3} & 0_{3\times3} & I_3 \\ 0_{3\times3} & 0_{3\times3} & -\hat{C}_{IG}^T & 0_{3\times3} \end{bmatrix} \qquad \text{Equation 9}$$

Each of the IMU measurements can be used for the state propagation in the EKF. Moreover, the EKF covariance matrix can be propagated every k+1 steps. State covariance is a (12+6N)×(12+6N) matrix as shown in Equation 8. $P_{II}$ is the 12×12 covariance matrix of the current IMU state; $P_{CC}$ is the 6N×6N covariance matrix of the poses of the optical sensor 110; and $P_{IC}$ is the 12×6N correlation between the errors in the IMU state and the pose estimates of the optical sensor 110. The state covariance propagation $P_{k+1}$ can be given by Equation 12.

$$P_{II} = FP_{II} + P_{II}F^T + GQ_{IMU}G^T \qquad \text{Equation 10}$$

$\Phi(t_k+T, t_k)$ is the state transition matrix.

$$P_{k|k} = \begin{bmatrix} P_{II_{k|k}} & P_{IC_{k|k}} \\ P_{IC_{k|k}}^T & P_{CC_{k|k}} \end{bmatrix} \qquad \text{Equation 11}$$

$$P_{k+1|k} = \begin{bmatrix} P_{II_{k|k}} & \Phi(t_k+T, t_k)P_{IC_{k|k}} \\ P_{IC_{k|k}}^T \Phi(t_k+T, t_k)^T & P_{CC_{k|k}} \end{bmatrix} \qquad \text{Equation 12}$$

When capturing a new image frame, the pose estimation for the optical sensor 110 can be computed from the IMU pose estimation. The pose estimate can be appended to the state vector, and the covariance matrix of the EKF can be augmented according to Equation 14, where $J_k$ is the Jacobian matrix.

$$\hat{P}_k \leftarrow \begin{bmatrix} I_{12+6N} \\ J_k \end{bmatrix} \hat{P}_k \begin{bmatrix} I_{12+6} \\ J_k \end{bmatrix}^T \qquad \text{Equation 13}$$

$$J_k = \begin{bmatrix} \hat{C}_{CI,k} & 0_{3\times6} & 0_{3\times3} & 0_{3\times6N} \\ (\hat{C}_{IG,k}^T P_{I,k}^{CI}) & 0_{3\times6} & I_3 & 0_{3\times6N} \end{bmatrix} \qquad \text{Equation 14}$$

$f_j$ can be a feature point that has been observed from a set of $M_j$ poses of the optical sensor 110. An inverse depth least-squares Gauss-Newton optimization method can be used to estimate a three-dimensional location of $f_j$. The residual for each measurement can be independent of the errors in the feature coordinates, and thus EKF updates can be performed based on the residual. $H_{x_i}$ and $H_{f_j}$ are the Jacobians of the measurement $z_i$ with respect to the state and the feature position, respectively. Kalman gain can then be calculated as $K = PT_H^T(T_H PT_H^T + R_n)^{(-1)}$, where $T_H$ is an upper triangular matrix from QR decomposition of the matrix $H_{X'}$. Finally, the state covariance matrix can be updated according to Equation 15.

$$P_{k+1|k} = (I_\xi - KT_H)P_{k+1|k}(I_\xi + KT_H)^T + KR_n K^T \qquad \text{Equation 15}$$

Referring again to FIG. 1, an embodiment of the trajectory determination device 100 using relative position sensors 106 comprising an OXTS RT 3003, by Oxford Technical Solutions Ltd. of Oxfordshire, United Kingdom, and an optical sensor 110 comprising a Flea 2 (FL2-14S3M-C), by Point Grey Research, Inc. of Richmond, Canada. An IMU data set containing acceleration and angular rate around three axes with 100 Hz sampling rate was recorded. Video frames were captured in gray-scale with 1242×375 pixel resolution (after calibration). Shutter time adjusted dynamically (maximum shutter time: 2 ms) and triggered at 10 Hz frequencies. The dataset provided well-calibrated camera intrinsic parameters and camera-IMU rotation and translation matrix. The IMU data and video frames were synchronized at 10 Hz. The translational average root mean squared error (ARMSE) was 4.154, the rotational ARMSE was 0.0266, and final translational error was 12.149. The accuracy demonstrated that the trajectory determination device 100 is capable for the GIS path searching algorithms described herein.

It should now be understood that the embodiments described herein relate to systems, methods, and devices that use a progressive topology to determine geolocation information. The embodiments can use map information abstracted as graph data structure, where various types of roads or building structures are modeled as graph edges and graph nodes. The progressive topology can be searched for within the abstracted map information in real time to determine a geolocation of a mobile platform. The embodiments described herein can use any type of relative position sensor to provide a multimodal solution to the problem of geonavigation. For example, different layers of map data from GIS databases can be adaptively abstracted based on the sensor suite available on the mobile platform. Additionally, the map graphs can be scaled to the resolution of the sensor. Accordingly, the determination of geolocation can be more robust to noisy, missing and mislabeled data than methods that utilize highly accurate input data. Moreover, the map graphs are scalable from campus area, to city, to state and upwards, while other methods are typically designed to function at a particular scale with associated issue of resolution of localization accuracy. Such methods can require accurate, updated, and accurately registered data, which is typically not available in real-world applications.

The embodiments described herein can provide seamless continuous navigation between indoor and outdoor environment. Specifically, GIS and BIM can be abstracted to map graphs that are used for navigation. The map graphs can be memory efficient. Thus, small low cost solutions can be provided by using low resolution sensors and map graphs on memory that are scaled to the size of the location being navigated. Additionally, the small solutions can be provided without requiring communication signals, i.e., internet or GPS, which can decrease power demands. Accordingly, small wearable devices can be used for navigating airport buildings, hospitals, malls, campus buildings, homes, or the like.

Additionally, due to the flexibility of sensor suites and the low power and memory demands, the embodiments described herein can be implemented on many existing smart phone applications. Thus, the embodiments described herein can be utilized to replace GPS-based navigation when the signal is blocked or when power on the smart phone needs to be conserved. For example, outdoor and indoor GPS-denied navigation can be implemented for seamless uninterrupted geo-navigation in all locations and environment conditions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system, comprising:
memory storing machine readable instructions; and
one or more processors to access the memory and execute the machine readable instructions to:
receive relative position signals generated for a device;
generate relative trajectories comprising directional information based on the relative position signals;
evaluate the directional information to identify a given discrete bin from a plurality of discrete bins for each relative trajectory;
transform each relative trajectory to a trajectory descriptor based on the given discrete bin;
connect each of the trajectory descriptors to define a progressive topology, wherein the progressive topology is a representation of a movement of the device;
compare the progressive topology to map data characterizing a region of interest, wherein the device is located within the region of interest; and
determine a geolocation for the device based on the comparison.

2. The system of claim 1,
further comprising an optical sensor to generate vision-based measurements; and
wherein the one or more processors execute the machine readable instructions to combine the relative position signals and the vision-based measurements.

3. The system of claim 1, further comprising one or more relative position sensors to generate a relative position signal for the device at each instance of time and the one or more processors generate the relative trajectories to provide a sequence of relative trajectories.

4. The system of claim 3, wherein the sequence of relative trajectories are quantized according to a sampling distance.

5. The system of claim 4, wherein to quantize the sequence of relative trajectories according to the sampling distance comprises:
determining a distance between a given relative trajectory of the sequence of relative trajectories and another relative trajectory of the sequence of relative trajectories;
comparing the distance relative to the sampling distance; and
transforming the relative position signal into a relative trajectory based on a result of the comparison.

6. The system of claim 1, wherein the device comprises at least one of a smart phone, a tablet, a smartwatch and a wearable device.

7. The system of claim 1 where the vision-based measurements comprise
monocular vision-based measurements.

8. The system of claim 1, wherein the transforming of each relative trajectory to a trajectory descriptor is performed by a fusion algorithm.

9. The system of claim 1, wherein the relative trajectory corresponds to three-dimensional (3D) motion of trajectory determination device, the relative trajectory being quantized into the trajectory descriptor using angle information corresponding to the 3D motion.

10. The system of claim 1, wherein the map data comprises a map graph with features computed as angles between each pair of edges at each node No with its neighbors $N=\{N_i, N_2, N_3\}$, or computed as rate of change of angles between each pair of edges at each node No with its neighbors $N=\{N_i, N_2, N_3\}$.

11. The system of claim 1, wherein the relative position signals comprises combining quaternion units and monocular vision-based measurements, the quaternion units represent rotations from global frame G to frame I of measurements of an inertial measurement unit (IMU) which comprises a gyroscope and accelerometer, and the monocular vision-based measurements are measured by an optical sensor based on the Earth-Centered, Earth-Fixed (ECEF) coordinates.

12. A system, comprising:
memory storing machine readable instructions; and
one or more processors to access the memory and execute the machine readable instructions to:
receive relative position signals generated for a device;
generate relative trajectories comprising directional information based on the relative position signals;
evaluate the directional information to identify a given discrete bin from a plurality of discrete bins for each relative trajectory;
transform each relative trajectory to a trajectory descriptor based on the given discrete bin; and
generate motion data characterizing a movement of the device over time based on the trajectory descriptors;
connect each of the trajectory descriptors to define a progressive topology,
wherein the progressive topology is a representation of a movement of the device;
compare the progressive topology to map data characterizing a region of interest, wherein the device is located within the region of interest, wherein the map data comprises a map graph of the region of interest, and the map graph comprises a plurality of graph paths; and
wherein the one or more processors execute the machine readable instructions further to:
generate a trajectory graph based on the progressive topology;
compute a similarity score between the trajectory graph and each of the plurality of graph paths; and
determine a geolocation for the device based on the comparison.

13. The system of claim 12,
wherein the progressive topology comprises a plurality of points separated by a given distance; and
wherein the one or more processors execute the machine readable instructions further to identify a set of points of the plurality of points as control points and a set of points of the plurality of points between the control points as edges, wherein the trajectory graph is generated based on the control points and the edges.

14. The system of claim 12,
wherein the plurality of graph paths comprise a sequence of quantized edge-orientations and the trajectory graph comprises a sequence of quantized edge-orientations; and
wherein to compute the similarity score comprises:
comparing the sequence of quantized edge-orientations of the trajectory graph relative to the sequence of quantized edge-orientations of the plurality of graph paths; and
assigning a similarity score to each comparison.

15. The system of claim 12, wherein the one or more processors execute the machine readable instructions further to:
evaluate each similarity score computed for the trajectory graph and a graph path of the plurality of graph paths relative to a score threshold to identify a similarity score with a highest value, determine the geolocation of the device based on the graph path associated with the similarity score with the highest value.

16. The system of claim 12, wherein the trajectory graph is a spline approximation of the progressive topology.

17. The system of claim 12, wherein the map graph is retrieved from one of a geospatial system database, a geographic information system (GIS) database and a building information model database.

18. The system of claim 12, wherein the progressive topology grows in size over time as the device moves about the region of interest;
wherein the trajectory graph grows commensurate in size with the progressive topology; and
wherein a larger trajectory graph at given instance of time relative to a smaller trajectory graph at another instance of time reduces a number of similarity scores computed between the trajectory graph and each of the plurality of graph paths.

19. The system of claim 12, wherein the region of interest comprises one of a building, a neighborhood within a municipality, a state, a city area, and an entire world.

20. A method, comprising:
receiving relative position signals generated for a device;
generating, with a processor, relative trajectories comprising directional information based on the relative position signals;
evaluating the directional information to identify a given discrete bin from a plurality of discrete bins for each relative trajectory;
transforming each relative trajectory to a trajectory descriptor based on the given discrete bin; and
generating motion data characterizing a movement of the device over time based on the trajectory descriptors.

21. The method of claim 20, further comprising:
connecting each of the trajectory descriptors to define a progressive topology, wherein the progressive topology is a representation of a movement of the device;
comparing the progressive topology to map data characterizing a region of interest, wherein the device is located within the region of interest, wherein the map data comprises a map graph of the region of interest, and the map graph comprises a plurality of graph paths;
generating a trajectory graph based on the progressive topology;
computing a similarity score between the trajectory graph and each of the plurality of graph paths; and
determining a geolocation for the device based on the comparison.

22. The method of claim 21, wherein the map graph comprises a plurality of graph paths representative by the features; and further comprising:
generating a trajectory graph based on the progressive topology; and
computing a similarity score between the trajectory graph and each of the features of the map graph.

23. The method of claim 21, wherein the plurality of graph paths comprise a sequence of quantized edge-orientations;
wherein the trajectory graph comprises a sequence of quantized edge-orientations; and
wherein the computing the similarity score comprises:
comparing the sequence of quantized edge-orientations of the trajectory graph relative to the sequence of quantized edge-orientations of the plurality of graph paths; and
assigning a similarity score to each comparison.

24. The method of claim 23, further comprising:
identifying one of unique nodes and edges in the map graph; and
weighting the similarity score according to the one of unique nodes and edges.

25. The method of claim 21, wherein the map data comprises a map graph with features computed as angles between each pair of edges at each node N0 with its neighbors N={Ni, N2, N3}, or computed as rate of change of angles between each pair of edges at each node No with its neighbors N={Ni, N2, N3}.

26. The method of claim 20, wherein the transforming of each relative trajectory to a trajectory descriptor is performed by a fusion algorithm.

27. The method of claim 20, wherein the relative trajectory corresponds to three-dimensional (3D) motion of trajectory determination device, the relative trajectory being quantized into the trajectory descriptor using angle information corresponding to the 3D motion.

28. The method of claim 20, wherein the relative position signals comprises combining quaternion units and monocular vision-based measurements, the quaternion units represent rotations from global frame G to frame I of measurements of an inertial measurement unit (IMU) which comprises a gyroscope and accelerometer, and the monocular vision-based measurements are measured by an optical sensor based on Earth-Centered, Earth-Fixed (ECEF) coordinates.

* * * * *